(12) United States Patent
Kawasaki

(10) Patent No.: US 12,466,314 B2
(45) Date of Patent: Nov. 11, 2025

(54) VEHICLE APPROACH NOTIFICATION DEVICE

(71) Applicant: TOYOTA JIDOSHA KABUSHIKI KAISHA, Toyota (JP)

(72) Inventor: Teppei Kawasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 7 days.

(21) Appl. No.: 18/768,185

(22) Filed: Jul. 10, 2024

(65) Prior Publication Data

US 2025/0065805 A1 Feb. 27, 2025

(30) Foreign Application Priority Data

Aug. 22, 2023 (JP) .................................. 2023-134775

(51) Int. Cl.
*B60Q 5/00* (2006.01)
*G08B 21/02* (2006.01)
*G10K 11/22* (2006.01)

(52) U.S. Cl.
CPC .............. *B60Q 5/005* (2013.01); *G10K 11/22* (2013.01); *B60Q 5/008* (2013.01); *G08B 21/02* (2013.01)

(58) Field of Classification Search
CPC .......... B60Q 5/005; B60Q 5/008; G08B 21/02
See application file for complete search history.

(56) References Cited

U.S. PATENT DOCUMENTS

| 5,465,079 | A  | * | 11/1995 | Bouchard | G07C 5/0858 |
| | | | | | 340/576 |
| 9,517,740 | B2 | * | 12/2016 | Okuyama | B60R 11/0217 |
| 9,764,687 | B2 | * | 9/2017 | Okuyama | H04R 1/2811 |
| 9,873,375 | B2 | * | 1/2018 | Matsubara | G10K 11/17855 |
| 11,114,084 | B2 | * | 9/2021 | Ino | H04R 1/2865 |
| 12,083,956 | B2 | * | 9/2024 | Ito | G10K 11/22 |
| 12,233,779 | B2 | * | 2/2025 | Kominato | B60Q 5/006 |
| 2010/0231368 | A1 | * | 9/2010 | Nakayama | B60Q 5/00 |
| | | | | | 340/425.5 |
| 2012/0182136 | A1 | * | 7/2012 | Nakayama | B60Q 5/008 |
| | | | | | 340/425.5 |
| 2012/0194328 | A1 | * | 8/2012 | Nakayama | B60Q 5/008 |
| | | | | | 340/425.5 |

(Continued)

FOREIGN PATENT DOCUMENTS

JP 2021-150714 A 9/2021

*Primary Examiner* — Hoi C Lau
(74) *Attorney, Agent, or Firm* — Oblon, McClelland, Maier & Neustadt, L.L.P.

(57) ABSTRACT

A vehicle approach notification device includes a sound emitter configured to output a notification sound. The sound emitter includes a vibration plate that generates sound, and sound guide tubes that outputs the notification sound toward an outside of the vehicle. The sound guide tubes include a first sound guide tube directed to a front area in front of the vehicle, and a second sound guide tube directed in a direction different from a direction in which the first sound guide tube is directed. Each of the sound guide tubes is configured to amplify a sound having a frequency corresponding to a tube path length of the sound guide tube by causing the sound generated by the vibration plate to resonate. The tube path length of the first sound guide tube and the tube path length of the second sound guide tube are different from each other.

5 Claims, 3 Drawing Sheets

(56) References Cited

U.S. PATENT DOCUMENTS

| | | | | |
|---|---|---|---|---|
| 2012/0194329 A1* | 8/2012 | Nakayama | ............... | H04R 3/04 |
| | | | | 340/425.5 |
| 2013/0106590 A1* | 5/2013 | Nakayama | ................ | B60L 3/00 |
| | | | | 340/425.5 |
| 2013/0265150 A1* | 10/2013 | Nakayama | ............. | H04R 23/00 |
| | | | | 340/425.5 |
| 2013/0314224 A1* | 11/2013 | Nakayama | ............... | B60Q 5/00 |
| | | | | 340/463 |
| 2013/0315418 A1* | 11/2013 | Nakayama | ............. | B60R 19/48 |
| | | | | 381/86 |
| 2014/0015653 A1* | 1/2014 | Nakayama | ........... | G10K 11/002 |
| | | | | 340/425.5 |
| 2014/0015654 A1* | 1/2014 | Nakayama | ............. | G10K 11/28 |
| | | | | 340/425.5 |
| 2016/0039375 A1* | 2/2016 | Okuyama | ........... | B60R 11/0217 |
| | | | | 293/117 |
| 2018/0174460 A1* | 6/2018 | Jung | ........................ | G08G 1/16 |
| 2019/0255994 A1* | 8/2019 | Christen | ................. | B60Q 5/00 |
| 2020/0189614 A1* | 6/2020 | Ito | ..................... | B60W 30/0956 |
| 2022/0174407 A1* | 6/2022 | Ito | ..................... | B60R 11/0217 |
| 2023/0086076 A1* | 3/2023 | Ito | .......................... | G10K 11/22 |
| | | | | 340/384.1 |
| 2023/0095260 A1* | 3/2023 | Tanaka | .................... | B60R 13/04 |
| | | | | 381/86 |
| 2023/0311755 A1* | 10/2023 | Kominato | ............. | B60Q 5/006 |
| 2025/0065805 A1* | 2/2025 | Kawasaki | ............... | G10K 11/22 |

\* cited by examiner

VEHICLE APPROACH NOTIFICATION DEVICE

CROSS-REFERENCE TO RELATED APPLICATIONS

This application is based upon and claims the benefit of priority from prior Japanese Patent Application No. 2023-134775, filed on Aug. 22, 2023, the entire contents of which are incorporated herein by reference.

BACKGROUND

1. Field

The present disclosure relates to a vehicle approach notification device.

2. Description of Related Art

In recent years, battery electric vehicles and hybrid electric vehicles, which can operate without generating engine noise, have been equipped with vehicle approach notification devices. A vehicle approach notification device emits a notification sound to the outside of the vehicle when the vehicle is traveling without generating engine noise. The notification sound emitted from the vehicle approach notification device notifies the surroundings of the approach of the vehicle.

Japanese Laid-Open Patent Publication No. 2021-150714 discloses a technique for efficiently generating a notification sound by emitting the notification sound amplified through resonance from sound emitting holes toward the outside of the vehicle.

A vehicle equipped with a vehicle approach notification device can inform pedestrians of the approach of the vehicle. However, when pedestrians hear the notification sound from the vehicle approach notification device, it is difficult for them, especially those with visual impairment, to determine whether the vehicle is approaching them or passing by their side.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle approach notification device mounted on a vehicle includes a sound emitter configured to output a notification sound for indicating approach of the vehicle, and processing circuitry configured to control the sound emitter. The sound emitter includes a vibration plate that is disposed in an internal space of the sound emitter and configured to generate sound, and sound guide tubes that are configured to output the notification sound toward an outside of the vehicle. The sound guide tubes include a first sound guide tube directed to a front area in front of the vehicle, and a second sound guide tube directed in a direction different from a direction in which the first sound guide tube is directed. Each of the sound guide tubes is configured to amplify a sound having a frequency corresponding to a tube path length of the sound guide tube by causing the sound generated by the vibration plate to resonate. The tube path length of the first sound guide tube and the tube path length of the second sound guide tube are different from each other.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, a vehicle approach notification device 10 according to an embodiment will be described with reference to FIGS. 1 to 3.

Structure of Vehicle Approach Notification Device 10

Figure 1:
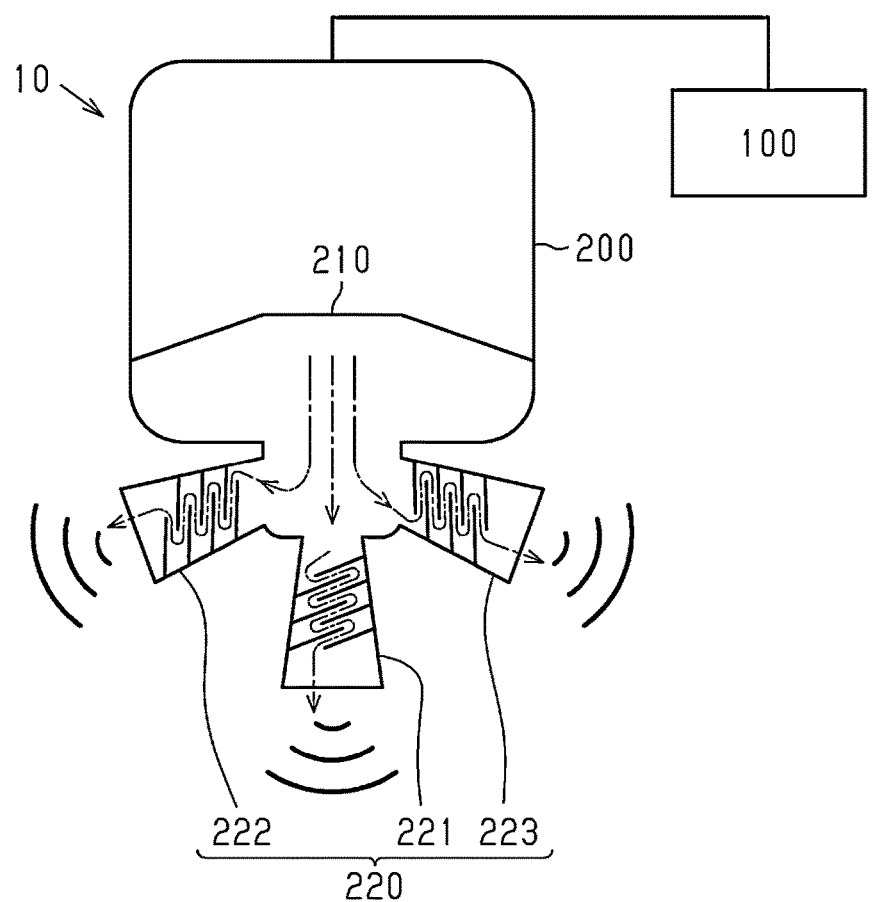
FIG. 1 is a schematic diagram showing a configuration of a vehicle approach notification device according to an embodiment.

As shown in FIG. 1, the vehicle approach notification device 10 includes a controller 100 and a sound emitter 200. The controller 100 is an electronic controller mainly constituted by a microcomputer. The controller 100 controls the sound emitter 200. The controller 100 may include processing circuitry including one or more processors that execute various processes in accordance with a computer program (software). The controller 100 may include processing circuitry including one or more dedicated hardware circuits such as an application-specific integrated circuit (ASIC) that executes at least a part of various processes. Alternatively, the controller 100 may include processing circuitry including a combination of the processor and the dedicated hardware circuit. The processor includes a CPU and a memory such as a RAM and a ROM. The memory stores program codes or instructions configured to cause the CPU to execute processes. Memory or computer-readable media includes any available media that can be accessed by a general purpose or special purpose computer.

A vibration plate 210 that generates sound is disposed in the internal space of the sound emitter 200. The vibration plate 210 generates a composite sound. Specifically, the vibration plate 210 generates white noise having substantially the same sound pressure over a wide range of frequency band.

The sound emitter 200 includes a plurality of sound guide tubes 220. Each sound guide tube 220 outputs a notification sound toward the outside of the vehicle 20. Each of the sound guide tubes 220 has a snail shape in which the inside thereof is a spiral tube path.

Figure 3:
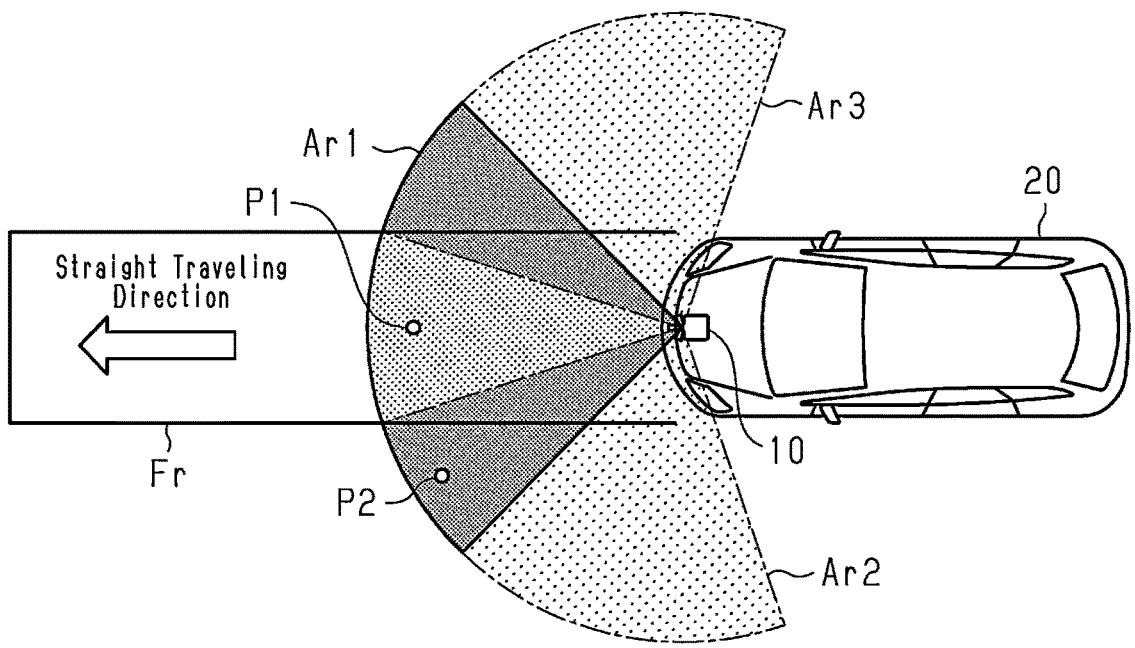
FIG. 3 is a schematic diagram showing effective ranges of notification sound in a case of a vehicle equipped with the vehicle approach notification device shown in FIG. 1.

As shown in FIG. 3, the vehicle approach notification device 10 is mounted on a vehicle 20. The vehicle 20 is, for example, a hybrid vehicle or an electric vehicle. The vehicle approach notification device 10 generates a notification sound during motor traveling in which the vehicle 20 travels by an electric motor. The notification sound is a sound for notifying surrounding pedestrians of the approach of the vehicle 20. An arrow shown in FIG. 3 indicates a straight traveling direction of the vehicle 20. A front area Fr is an area through which the vehicle 20 passes when the vehicle 20 travels straight.

As shown in FIG. 1, the sound emitter 200 includes three sound guide tubes 220, which are a first sound guide tube 221, a second sound guide tube 222, and a third sound guide tube 223. The first sound guide tube 221 is directed toward the front area Fr. The second sound guide tube 222 is directed in a direction angled toward one of opposite sides of the vehicle 20 with respect to the direction in which the first sound guide tube 221 is directed. The third sound guide tube 223 is directed in a direction angled toward the other one of the opposite sides of the vehicle 20 with respect to the direction in which the first sound guide tube 221 is directed. The first sound guide tube 221 has a tube path length different from those of the second sound guide tube 222 and the third sound guide tube 223.

Resonance of Sound by Sound Guide Tube 220

Figure 2:
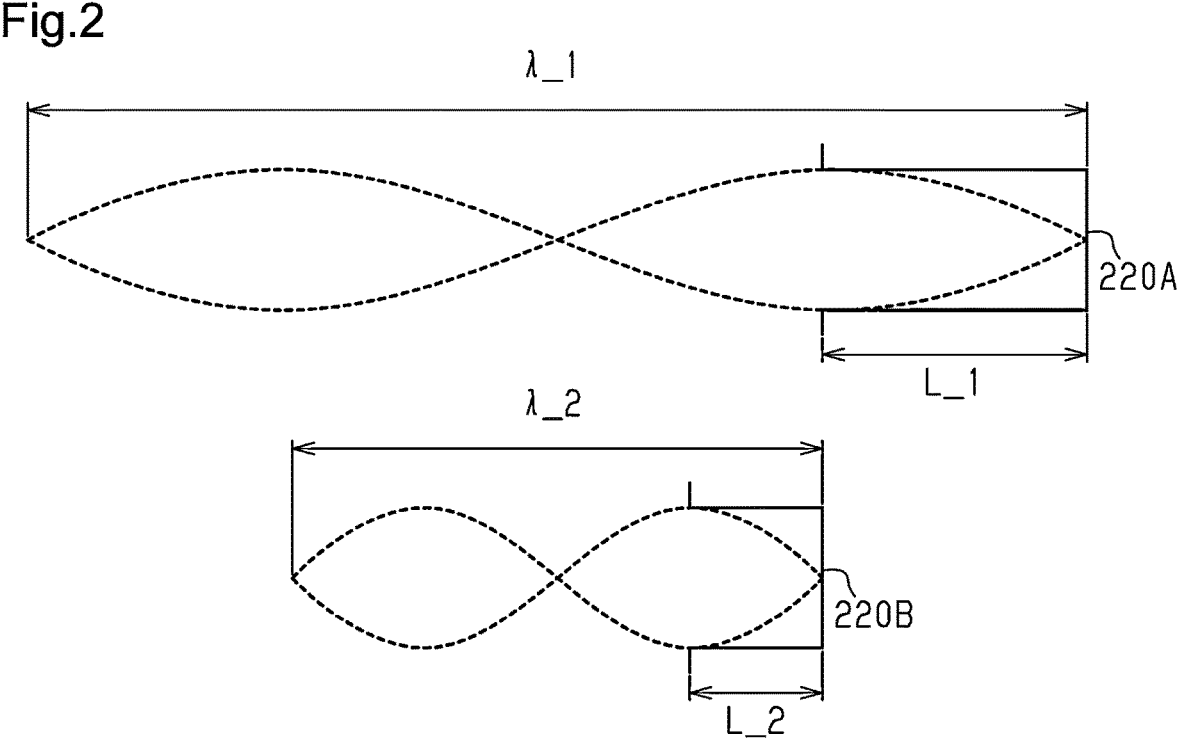
FIG. 2 is a schematic diagram showing resonance of sound generated in a sound guide tube.

As shown in FIG. 2, the resonance and amplification of the sound generated in each sound guide tube 220 will be described by taking an L1 sound guide tube 220A and an L2 sound guide tube 220B as examples.

The L1 sound guide tube 220A is a sound guide tube 220 having a tube path length L_1. A standing wave of a wavelength $\lambda\_1$ is formed by interference between an incident sound that enters the L1 sound guide tube 220A from the sound emitter 200 and a reflected sound that is the incident sound reflected in the L1 sound guide tube 220A. The wavelength $\lambda\_1$ of the standing wave formed in the L1 sound guide tube 220A is four times the tube path length L_1 of the L1 sound guide tube 220A. A standing wave of a wavelength $\lambda\_2$ is formed in the L2 sound guide tube 220B, which has a tube path length L_2 shorter than the tube path length L_1. The wavelength $\lambda\_2$ of the standing wave formed in the L2 sound guide tube 220B is four times the tube path length L_2 of the L2 sound guide tube 220B. Standing waves having different wavelengths are formed in accordance with the lengths of the respective sound guide tubes 220. At the frequency at which a standing wave is formed, resonance occurs so that the sound pressure of the notification sound is amplified. Each sound guide tubes 220 amplifies the notification sound having a frequency corresponding to the tube path length of the sound guide tube 220.

As shown in FIG. 1, the sound generated by the vibration plate 210 resonates inside the first sound guide tube 221, the second sound guide tube 222, and the third sound guide tube 223. Due to the resonance, the first sound guide tube 221, the second sound guide tube 222, and the third sound guide tube 223 amplify a sound of a frequency corresponding to each tube path length. The amplified sound is emitted as a notification sound from the first sound guide tube 221, the second sound guide tube 222, and the third sound guide tube 223.

Effective Range of Notification Sound

A range in which the sound pressure of the notification sound output from the sound guide tube 220 is greater than or equal to the predetermined sound pressure is referred to as an effective range of the notification sound.

As shown in FIG. 3, an effective range of the notification sound output from the first sound guide tube 221 is a first effective range Ar1. The effective range of the notification sound output from the second sound guide tube 222 is the second effective range Ar2. The effective range of the notification sound output from the third sound guide tube 223 is a third effective range Ar3.

In FIG. 3, a point P1 is a point within the front area Fr and the first effective range Ar1. The pedestrians located at the point P1 can hear only the notification sound emitted from the first sound guide tube 221 at a pressure greater than or equal to the predetermined pressure. The point P2 is a point at which the first effective range Ar1 and the second effective range Ar2 partially overlap each other on the side of the front area Fr. The pedestrians located at the point P2 hear a sound in which the notification sound emitted from the first sound guide tube 221 and the notification sound emitted from the second sound guide tube 222 are mixed, at a predetermined sound pressure or higher. The notification sound heard by the pedestrians is different between the point P1 located in the front area Fr and the point P2 located on the side of the front area Fr.

Operation of Present Embodiment

The vehicle approach notification device 10 generates a notification sound toward the front area Fr through the first sound guide tube 221. The vehicle approach notification device 10 generates a notification sound having a frequency different from that of the notification sound emitted toward the front area Fr on both sides of the front area Fr through the second sound guide tube 222 and the third sound guide tube 223. Therefore, the sound heard as the vehicle 20 approaches is different between the point P1 located in the front area Fr and the point P2 located on the side of the front area Fr.

Therefore, the pedestrian can easily determine whether the vehicle 20 equipped with the vehicle approach notification device 10 is traveling toward the pedestrian or passing by the pedestrian.

At the position where the effective ranges overlap, the sound of the notification sound is a sound in which notification sounds of a plurality of frequencies are mixed. That is, the notification sound heard by the pedestrian is different between the point P2 where the effective ranges overlap and the point P1 where the effective ranges do not overlap.

In the present embodiment, a point P1 at which the effective ranges do not overlap is set in the front area Fr. In this case, the pedestrian can grasp the relationship between the traveling direction of the vehicle 20 and the position of the pedestrian by the change in the audible notification sound.

Advantages of Present Embodiment (1) The vehicle approach notification device 10 can generate a notification sound with which a pedestrian can easily determine whether the vehicle 20 is traveling toward the pedestrian or the vehicle 20 passes through the vicinity of the pedestrian. Therefore, the vehicle approach notification device 10 ensures the safety of the pedestrian.

(2) The vehicle approach notification device 10 includes, as the sound guide tubes 220, the first sound guide tube 221 and the second sound guide tube 222 which is directed in a direction angled to one side of both sides of the vehicle 20 with respect to a direction in which the first sound guide tube 221 is directed. The vehicle approach notification device 10 includes, as the sound guide tubes 220, a third sound guide tube 223 directed in a direction angled to the other side of both sides of the vehicle 20 with respect to the direction in which the first sound guide tube 221 is directed. The tube path length of the first sound guide tube 221 is different from the tube path length of the second sound guide tube 222. The tube path length of the first sound guide tube 221 is different from the tube path length of the third sound guide tube 223.

The vehicle approach notification device 10 generates a notification sound toward the front area Fr through the first sound guide tube 221. The vehicle approach notification device 10 generates a notification sound having a frequency different from that of the notification sound emitted toward the front area Fr on both sides of the front area Fr through the second sound guide tube 222 and the third sound guide tube 223. Therefore, a pedestrian located in the front area Fr and a pedestrian located on the side of the front area Fr hear different sounds as the vehicle 20 approaches. Therefore, the pedestrian can easily determine whether the vehicle 20 equipped with the vehicle approach notification device 10 is traveling toward the pedestrian or passing by the pedestrian.

(3) The sound guide tube 220 has a snail shape in which the inside is a spiral tube path. The sound guide tube 220 that causes the resonance phenomenon needs to have a tube path length corresponding to the frequency of the notification sound to be output. As in the above-described configuration, when the snail type sound guide tube 220 in which the inside is a spiral tube path is adopted, the sound guide tube 220 having a necessary tube path length can be realized in a small space as compared with a straight cylindrical tube path. Therefore, the vehicle approach notification device 10 can be downsized.

(4) The vehicle approach notification device 10 is configured to generate white noise over a wide frequency band from the vibration plate 210. The vibration plate 210 is configured to generate white noise over a frequency band including at least a plurality of different frequencies at which resonance occurs in the sound guide tubes 220 having different tube path lengths. When the vibration plate 210 generates white noise that does not have a specific peak frequency, the vehicle approach notification device 10 can generate a resonance sound corresponding to the tube path length of the sound guide tube 220 through the sound guide tubes 220 having different tube path lengths. When the vibration plate 210 generates white noise having no specific peak frequency, the vehicle approach notification device 10 can generate different resonance sounds through the sound guide tubes 220 having different tube path lengths. Thus, a plurality of different resonance sounds can be generated by one sounding body.

Figure 4:
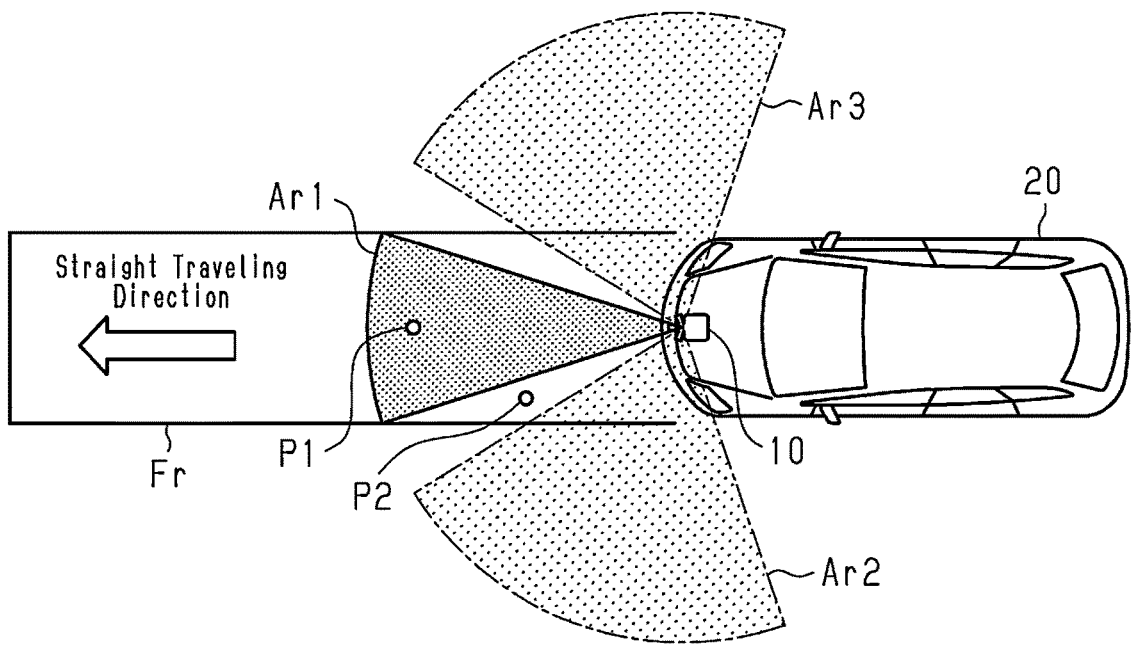
FIG. 4 is a schematic diagram showing a case in which positions that are not included in any of the effective ranges of notification sound are present in the front area in front of the vehicle.

(5) FIG. 4 illustrates a case in which a point P1 within the effective range of the notification sound and a point P2 not included in the effective range of the notification sound are present in the front area Fr. In this case, pedestrians at the point P1 hear the notification sound output from the first sound guide tube 221 and having a pressure greater than or equal to the predetermined pressure. An arrow shown in FIG. 4 indicates a straight traveling direction of the vehicle 20. When the vehicle 20 travels straight toward the pedestrian at the point P1, the relative positions of the pedestrian with respect to the vehicle 20 approach the vehicle 20. When the pedestrian is present at the point P2, the notification sound heard by the pedestrian becomes lower than the predetermined sound pressure even though the vehicle 20 is approaching the pedestrian. When the audible notification sound becomes small, the pedestrian may misunderstand that the vehicle 20 has moved away from the pedestrian even though the vehicle 20 is approaching the pedestrian.

The sound guide tubes 220 are provided so that a plurality of effective ranges of a plurality of notification sounds output from the sound guide tubes 220 partially overlap each other. The vehicle approach notification device 10 is configured to eliminate a range in which the notification sound becomes small in the front area Fr by providing the sound guide tubes 220 such that the effective ranges overlap each other. Thus, the vehicle approach notification device 10 can prevent the pedestrian from misunderstanding that the vehicle 20 has moved away.

Modifications

The above-described embodiment may be modified as follows. The above-described embodiment and the following modifications can be combined as long as the combined modifications remain technically consistent with each other.

Figure 5:
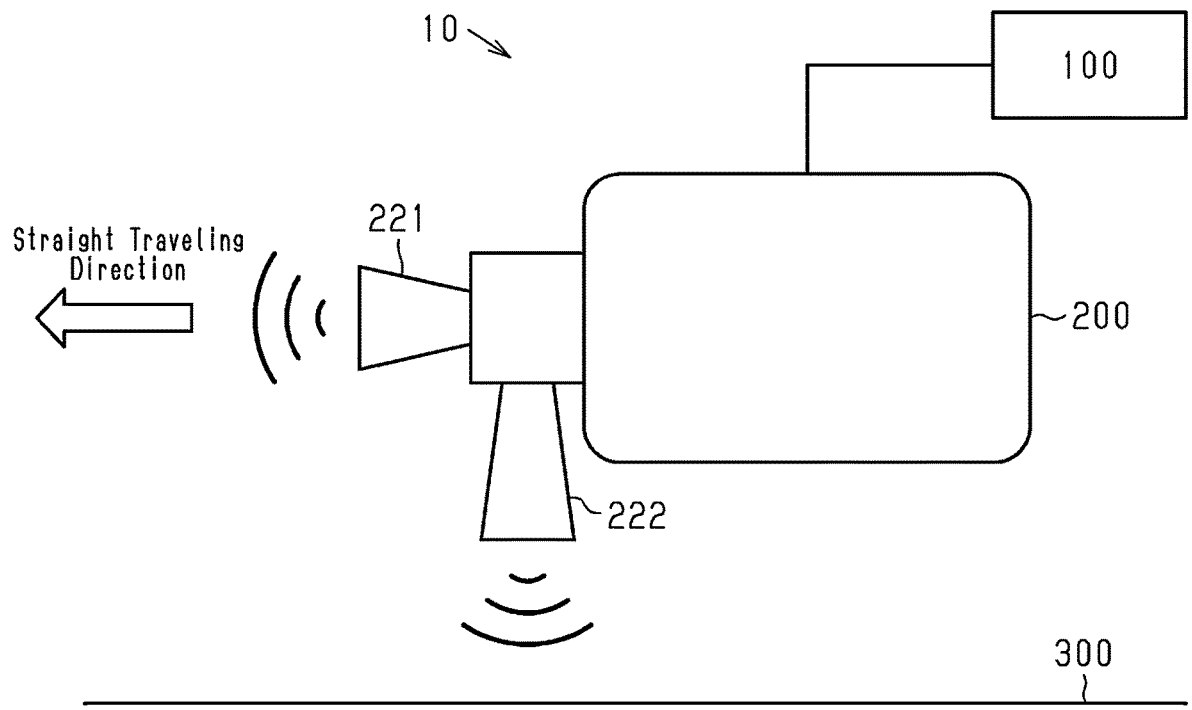
FIG. 5 is a schematic diagram showing a configuration of a vehicle approach notification device according to a modification.
Figure 6:
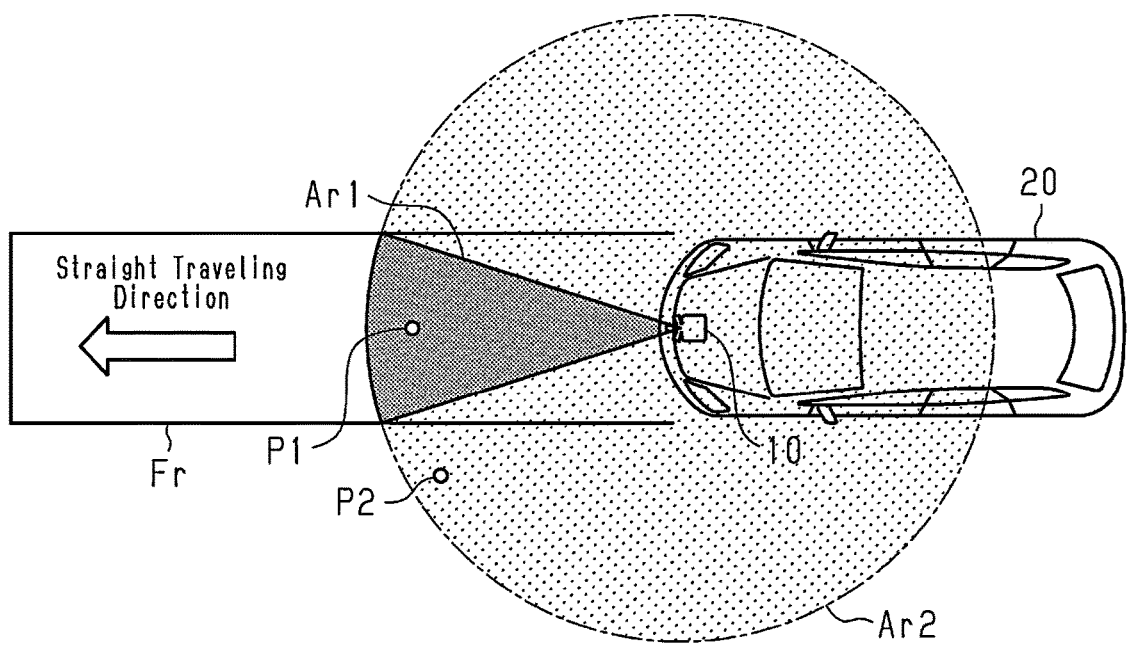
FIG. 6 is a schematic diagram showing effective ranges of notification sound in a case of a vehicle equipped with the vehicle approach notification device shown in FIG. 5.

In a case in which the vehicle approach notification device 10 can generate sounds of different frequencies in the traveling direction of the vehicle 20 and around the vehicle 20, the vehicle approach notification device 10 may include only two sound guide tubes 220. For example, as illustrated in FIG. 5, the vehicle approach notification device 10 may include a first sound guide tube 221 installed so as to face the front area Fr and a second sound guide tube 222 installed so as to face the road surface 300. An arrow shown in FIG. 5 indicates a straight traveling direction of the vehicle 20 on which the vehicle approach notification device 10 is mounted. In this case, as shown in FIG. 6, the vehicle approach notification device 10 can generate sounds of different frequencies between the front area Fr and the surroundings of the vehicle 20. An arrow shown in FIG. 6 indicates a straight traveling direction of the vehicle 20. In the front area Fr, the first effective range Ar1 of the notification sound output from the first sound guide tube 221 and the second effective range Ar2 of the notification sound output from the second sound guide tube 222 overlap each other. For this reason, both the notification sound output from the first sound guide tube 221 and the notification sound output from the second sound guide tube 222 are heard at the predetermined sound pressures or higher by the pedestrian located at the point P1 within the range where the first effective range Ar1 and the second effective range Ar2 overlap each other. A pedestrian located at a point P2, where the first effective range Ar1 and the second effective range Ar2 do not overlap with each other, hears only the notification sound output from the second sound guide tube 222 at a sound pressure greater than or equal to the predetermined sound pressure. In this way, even in a case in which the range in which the effective ranges overlap each other is set to the front area Fr, the pedestrian can recognize the relationship between the traveling direction of the vehicle 20 and the position of the pedestrian by the change in the audible notification sound.

The vibration plate 210 of the vehicle approach notification device 10 may emit a sound other than white noise. In this case, the vibration plate 210 may generate sounds of a plurality of frequencies at which resonance occurs in all the sound guide tubes 220 included in the sound emitter 200.

The sound guide tubes 220 of the vehicle approach notification device 10 do not necessarily need to have a snail-shaped structure with an internal spiral tube path. For example, the sound guide tube 220 may have a cylindrical shape in which resonance is possible.

The vehicle approach notification device 10 may include four or more sound guide tubes 220. In this case, the vehicle approach notification device 10 can generate resonance sounds at four or more frequencies.

The sound guide tube 220 of the vehicle approach notification device 10 may emit a sound having directivity. In this case, the sound guide tubes 220 may be installed in the vehicle approach notification device 10 such that there is no range in which the notification sound is lower than the predetermined sound pressure in the front area Fr and both sides of the front area Fr.

The effective ranges of the notification sounds in the sound guide tubes 220 of the vehicle approach notification device 10 may not partially overlap each other. In this case, it is preferable that the sound guide tube 220 is provided in the vehicle approach notification device 10 such that a range in which the notification sound is lower than the predetermined sound pressure in the front area Fr and both sides of the front area Fr is eliminated or minimized.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle approach notification device mounted on a vehicle, comprising:
    a sound emitter configured to output a notification sound for indicating approach of the vehicle; and
    processing circuitry configured to control the sound emitter, wherein
    the sound emitter includes:
        a vibration plate that is disposed in an internal space of the sound emitter and configured to generate sound; and
        sound guide tubes that are configured to output the notification sound toward an outside of the vehicle,
    the sound guide tubes include:
        a first sound guide tube directed to a front area in front of the vehicle; and
        a second sound guide tube directed in a direction different from a direction in which the first sound guide tube is directed,
    each of the sound guide tubes is configured to amplify a sound having a frequency corresponding to a tube path length of the sound guide tube by causing the sound generated by the vibration plate to resonate, and
    the tube path length of the first sound guide tube and the tube path length of the second sound guide tube are different from each other.

2. The vehicle approach notification device according to claim 1, wherein
    the second sound guide tube is directed in a direction angled toward one of opposite sides of the vehicle with respect to a direction in which the first sound guide tube is directed,
    the sound guide tubes further include a third sound guide tube that is directed in a direction angled toward the other one of the opposite sides of the vehicle with respect to the direction in which the first sound guide tube is directed, and
    the tube path length of the first sound guide tube and the tube path length of the third sound guide tube are different from each other.

3. The vehicle approach notification device according to claim 1, wherein the sound guide tubes each have a snail-shaped structure with an internal spiral tube path.

4. The vehicle approach notification device according to claim 1, wherein the vibration plate is configured to generate white noise over a frequency band including at least different frequencies at which resonance occurs in the sound guide tubes.

5. The vehicle approach notification device according to claim 1, wherein
    a range in which a sound pressure of the notification sound output from each of the sound guide tubes is greater than or equal to a prescribed sound pressure is an effective range of the notification sound, and
    the sound guide tubes are arranged such that the effective ranges of the notification sound output from the sound guide tubes partially overlap with each other.

* * * * *